US006374649B1

(12) United States Patent
Holcomb et al.

(10) Patent No.: US 6,374,649 B1
(45) Date of Patent: Apr. 23, 2002

(54) ELECTRONIC REMOTE ENTRY LOCK SYSTEM FOR A TOOL CABINET

(75) Inventors: Gregory J. Holcomb; Kent C. Johnson, both of Cedar Falls, IA (US)

(73) Assignee: Waterloo Industries, Inc., Waterloo, IA (US)

(*) Notice: Subject to any disclaimer, the term of this patent is extended or adjusted under 35 U.S.C. 154(b) by 0 days.

(21) Appl. No.: 09/285,145

(22) Filed: Apr. 1, 1999

Related U.S. Application Data

(60) Provisional application No. 60/118,557, filed on Feb. 4, 1999.

(51) Int. Cl.[7] .............................................. G05B 65/44

(52) U.S. Cl. ......................... 70/78; 70/278.6; 70/278.1; 312/215; 340/825.31

(58) Field of Search ..................... 70/256, 278.1–278.7, 70/78–85, 279.1; 340/825.31–825.34; 312/215–221; 292/DIG. 25

(56) References Cited

U.S. PATENT DOCUMENTS 3,648,241 A * 3/1972 Naito et al. ......... 340/825.31 X
4,267,942 A * 5/1981 Wick, Jr. et al. ....... 312/209 X
4,303,287 A * 12/1981 Taplin ........................ 312/215
5,225,825 A * 7/1993 Warren ................... 312/215 X
5,257,860 A * 11/1993 Slivon ....................... 70/78 X
5,385,039 A * 1/1995 Feldpausch et al. ........... 70/78
5,392,025 A * 2/1995 Figh et al. .......... 340/825.32 X
5,720,535 A 2/1998 Mehman
5,805,074 A * 9/1998 Warren et al. .............. 70/78 X
5,820,234 A * 10/1998 Capwell et al. ........ 70/278.1 X
5,862,689 A * 1/1999 Wen ............................. 70/85
5,941,106 A * 8/1999 Williamson, Jr. et al. .. 70/278.1
6,068,305 A * 5/2000 Myers et al. ............... 70/78 X
6,116,067 A * 9/2000 Myers et al. ............... 70/78 X
6,130,621 A * 10/2000 Weiss .................... 340/825.31

* cited by examiner

*Primary Examiner*—Suzanne Dino Barrett
(74) *Attorney, Agent, or Firm*—Banner & Witcoff, Ltd.

(57) ABSTRACT

A tool chest with multiple, vertical drawers includes a remotely controlled latching mechanism. A receiver mounted in the cabinet receives a signal from a remote transmitter and initiates operation of a motor to, in turn, drive a linkage which engages or releases a catch on the back side of each drawer.

8 Claims, 5 Drawing Sheets

FIG. 5
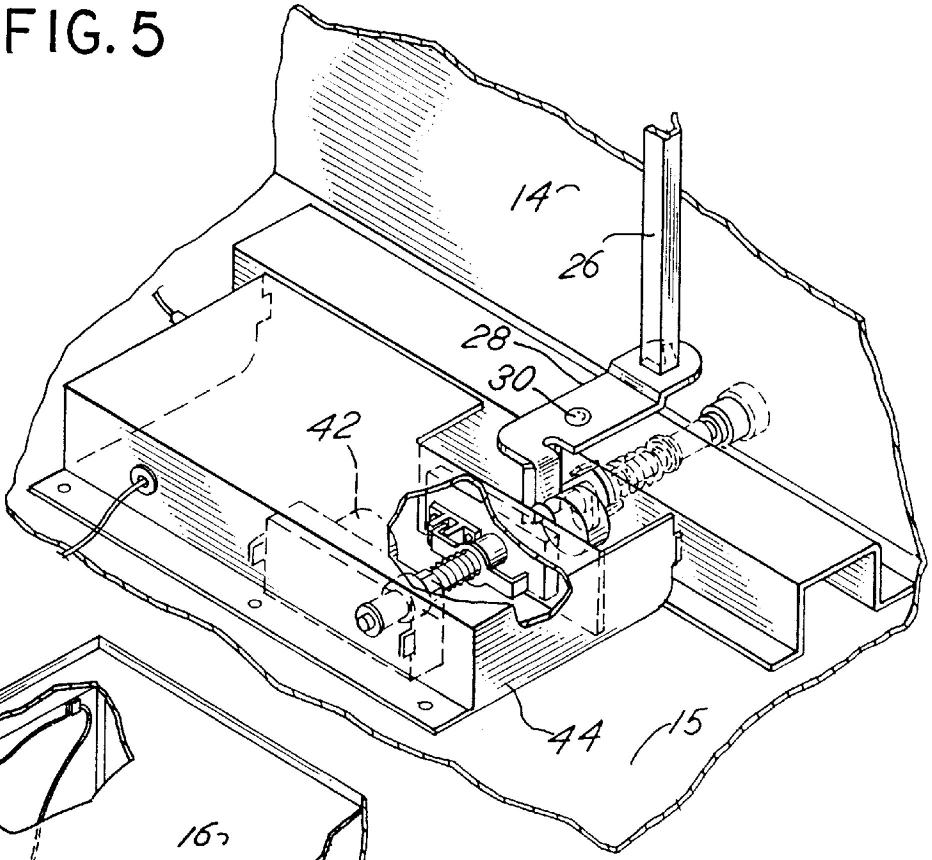
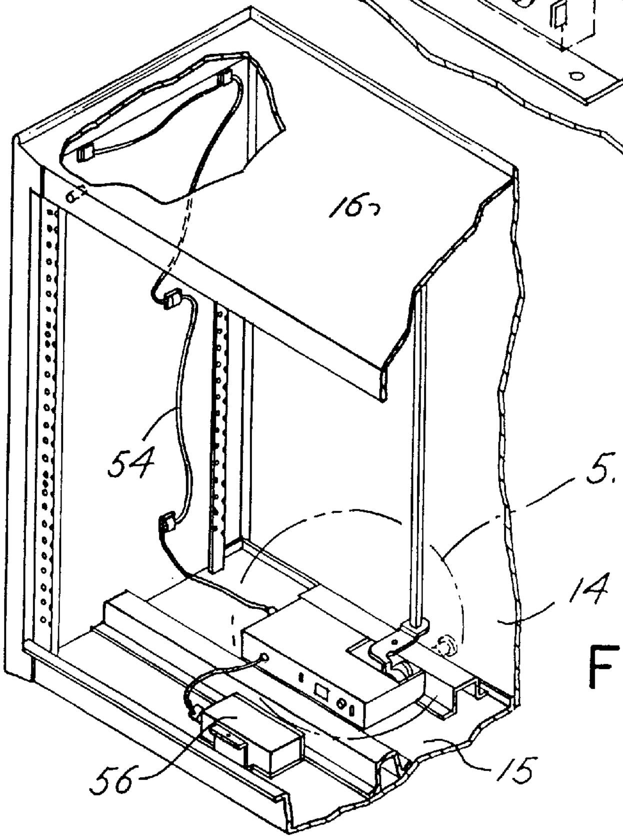
FIG. 4

FIG.8
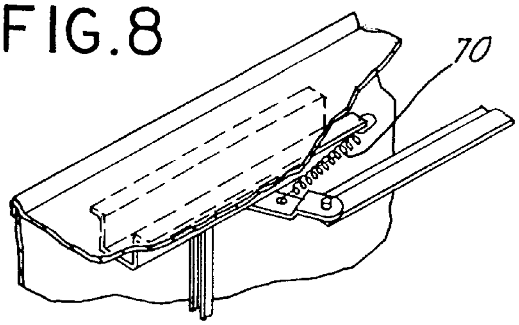
FIG.9
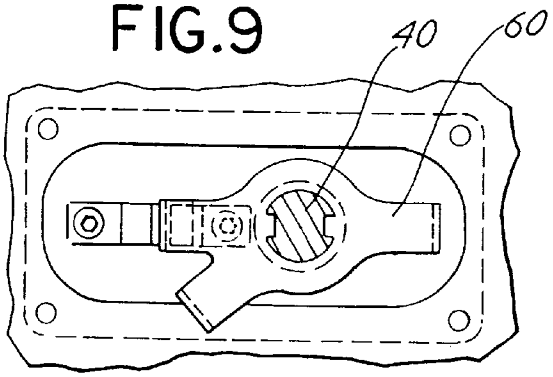
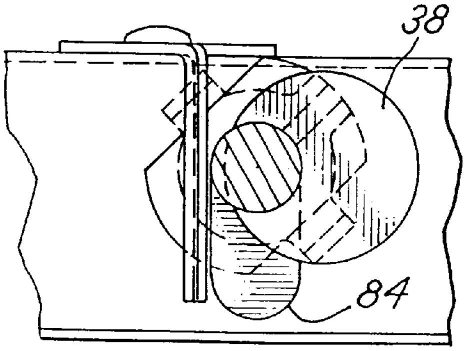
FIG.10
FIG.11
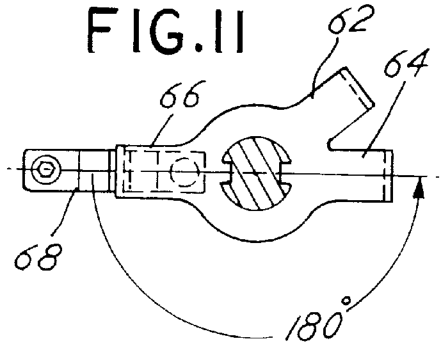
FIG.12
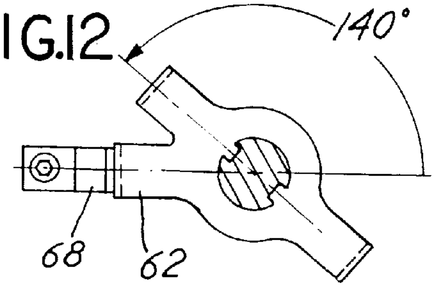
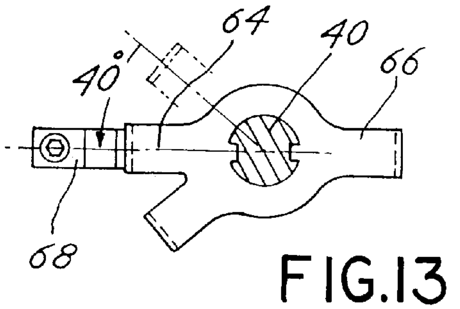
FIG.13

ELECTRONIC REMOTE ENTRY LOCK SYSTEM FOR A TOOL CABINET

CROSS REFERENCE TO RELATED APPLICATION

This is a utility application based upon provisional application Ser. No. 60/118,557 filed Feb. 4, 1999 for which priority is claimed.

BACKGROUND OF THE INVENTION

This invention relates to a system for locking a tool cabinet by means of a remote control transmitter. Mechanics and tradesmen maintain a personal and complete set of tools typically in a tool cabinet. The tools are often special and customized for use by the mechanic, tradesman or the like and as such, it is desirable to have a high level of security with respect to tool boxes and cabinets. Of course, mechanically actuated locks operated by traditional keys are typically the type of security available for tool cabinets and chests. There has developed a need, however, to have a similar or adequate degree of security for tool cabinets which can be remotely controlled. By providing remote control, the cabinet can be easily locked and/or unlocked while the mechanic is on the job. Thus, there has developed a need for means and construction in a tool cabinet which will be susceptible to a remote control mechanism.

SUMMARY OF THE INVENTION

In a principal aspect, the present invention comprises a tool storage cabinet with a locking system controllable by a remote control transmitter. The storage cabinet includes a cabinet housing wherein a series of drawers are mounted in a cabinet and a latch plate projects rearwardly from the backside of at least one drawer. The latch plate includes a retention hook for engaging a vertical locking bar mounted within the housing which may be pivoted to a position to engage the latch plate retention hook or to be disengaged from the latch plate retention hook. The actuator for engaging and disengaging the locking bar includes a cam mechanism, which is driven by a drive motor responsive to a remote control means for controlling the operation of the motor.

Thus, it is an object of the invention to provide an improved remotely controlled, high security cabinet construction of the type having multiple drawers.

It is a further object of the invention to provide an improved remote control, keyless security system for mechanics and workmen's tool cabinets and chests.

Another object of the invention is to provide a rugged, inexpensive, simple to use, and economical remote control security system for a tool chest or cabinet.

Yet a further object of the invention is to provide a remote control locking system for a cabinet of the type having multiple drawers arranged in vertical array or in vertical and side by side array.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 4 is an enlarged partial isometric view illustrating the vertical locking bar and motor assembly incorporated in a cabinet housing with the system of the invention;

FIG. 5 is a partial cut away isometric view of the control mechanism depicted in FIG. 4;

FIG. 8 is a partial isometric view illustrating the biasing mechanism for maintaining the locking bar in a closed position incorporated in the cabinet housing of the embodiment of the invention;

FIG. 9 is a cross-sectional view of a sensor mechanism associated with the motor shaft and cam mechanism that operates the locking bar in the system of the invention;

FIG. 10 is a cross-sectional view of the cam mechanism associated with the latch assembly of the invention, FIG. 11 is similar to FIG. 9 and is a cross-sectional view illustrating the sensor in the unlocked position;

FIG. 12 illustrates the sensor of FIG. 11 in a pre-locked position; and

FIG. 13 illustrates the sensor of FIG. 11 in the fully locked position.

DESCRIPTION OF THE PREFERRED EMBODIMENT

Figure 1:
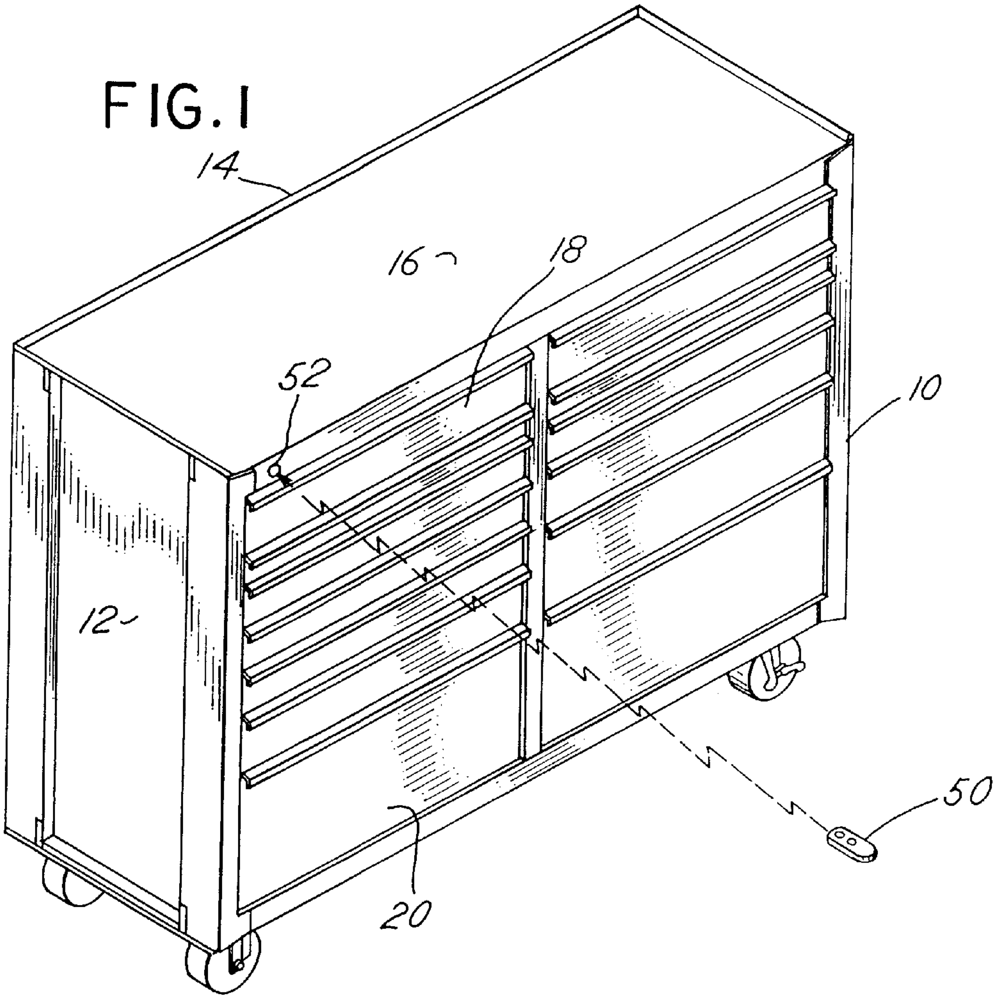
FIG. 1 is a isometric view of the embodiment of the invention in an assembled cabinet construction.
Figure 2:
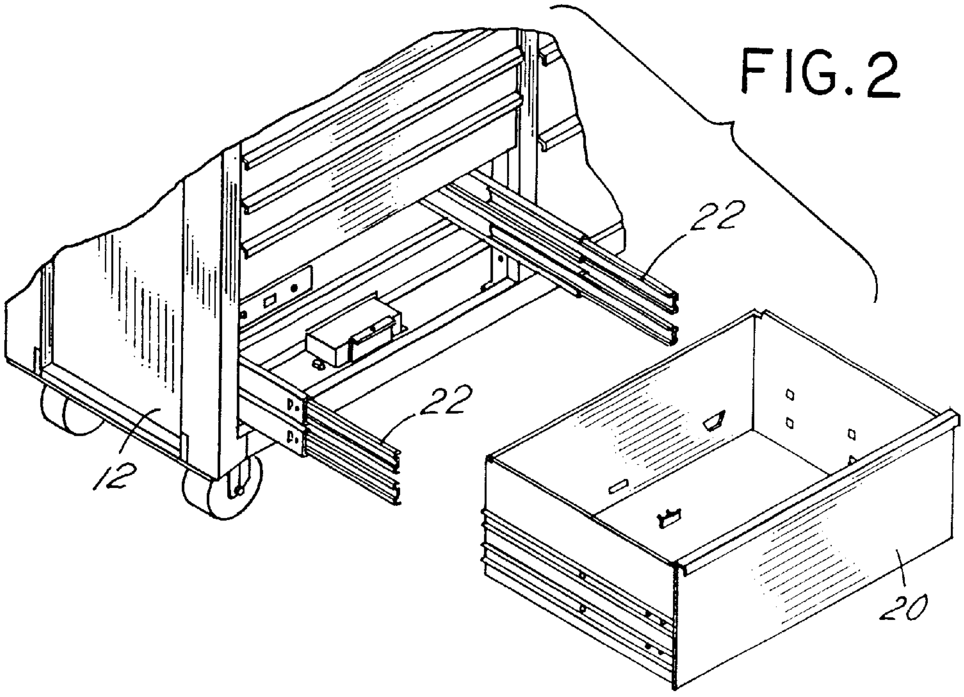
FIG. 2 is a partially exploded, isometric view of a portion of the cabinet of FIG. 1 incorporating the system of the invention.
Figure 3:
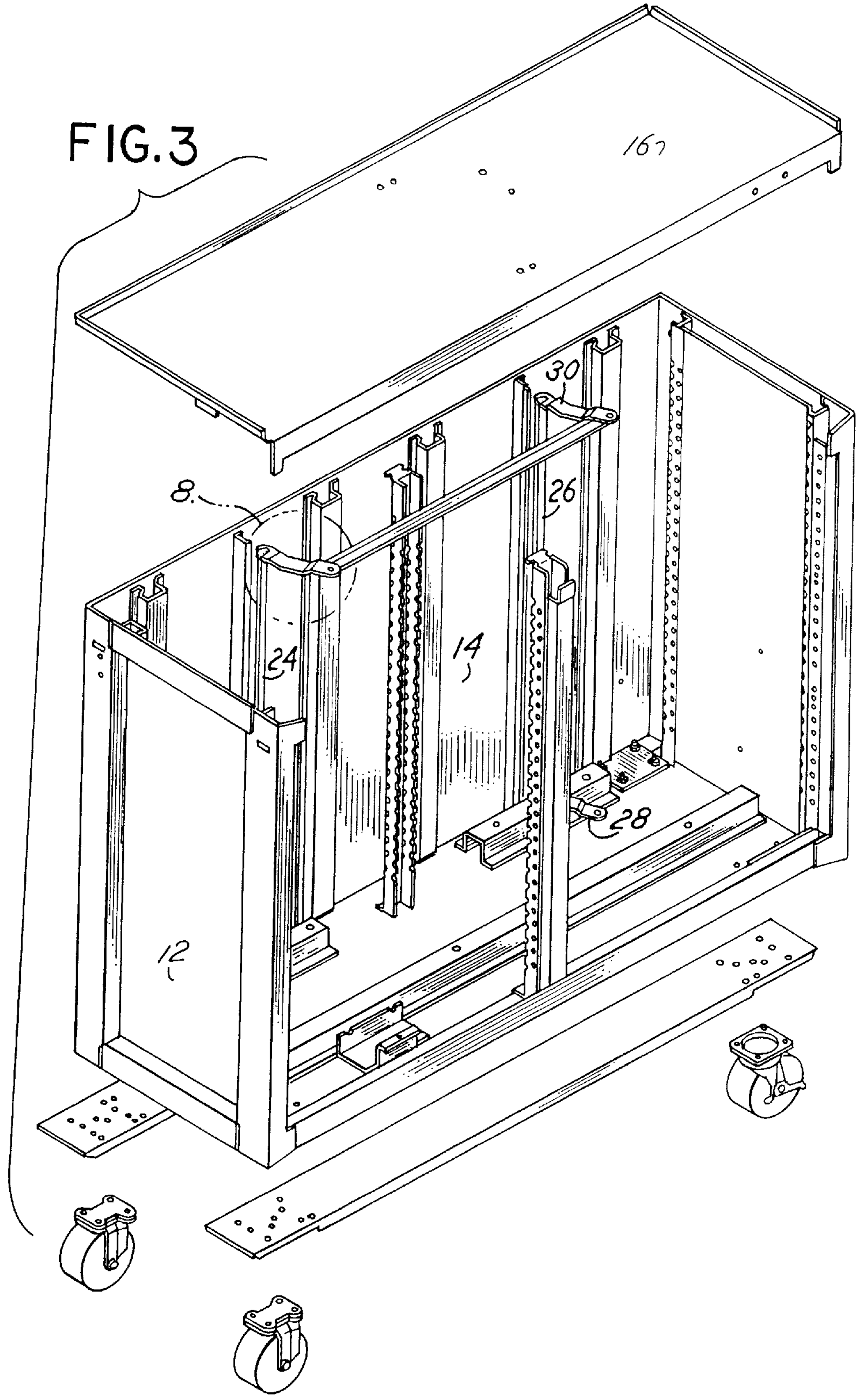
FIG. 3 is an exploded, isometric view of a cabinet incorporating the system of the invention.

The cabinet of the invention is typically a formed sheet metal cabinet as depicted in FIG. 1. Thus a cabinet 10 includes opposite end sides (including end side 12), back side 14, bottom side 15 and top side 16. Drawers, such as drawers 18 and 20, are mounted on slides 22 as shown in FIG. 2 for ease of movement into and out of the cabinet housing 10. FIG. 3 illustrates in greater detail, in an exploded isometric view, the component parts. Referring to FIG. 3, a first and second pair of locking bars 24 and 26 are vertically mounted adjacent the back side 14. Each locking bar 24 and 26 is associated with a separate, vertical set of drawers. The locking bars 24 and 26 are each mounted on lever arms such as lever arms 28 and 30 supporting bar 26. The lever arms 28 and 30 are mounted or attached to the distal or opposite ends of locking bar 26. The lever arms 28, 30 are pivotal about an intermediate connection point such as connection point or pivot connection 30 in FIG. 5 of lever 28.

The locking bar or latch bar 26 may thus pivot about the vertical axis through the pivot point 30 in an arc to thereby engage or disengage one or more drawer latch plates such as latch plate 32 attached to the back side of each drawer, such as drawer 20. The latch plate 32 thus includes a hooked end 34 which is adapted to engage against the locking bar 26 which is mounted to pivot on the lever arm 28. The lever arm 28 further includes a cam surface 36 on the side opposite pivot 30 distal from the connection of bar 26 to arm 28. The cam surface 36 is sufficiently large so that it can be engaged by a cam 38 mounted on a shaft 40 of a motor 42 mounted in a housing 44 within the cabinet housing 10. Housing 44 is thus mounted on the bottom side or surface 15 of the housing 10 beneath drawer 20. The motor 42 thus may be operated in response to control sensors to rotate the shaft 40.

Figure 7:
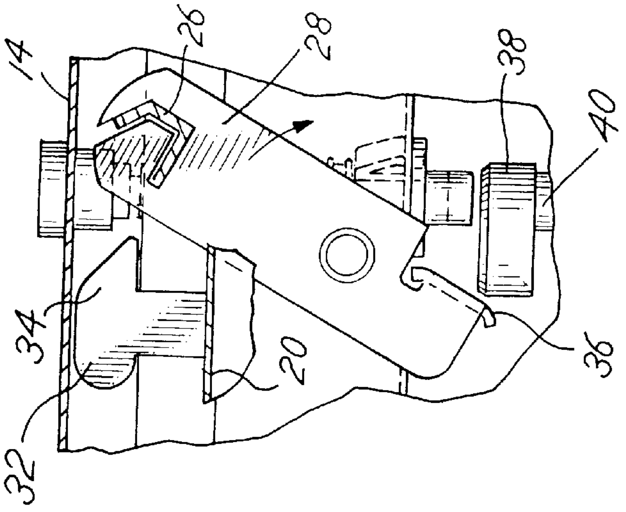
FIG. 7 is an enlarged top plan view illustrating movement of the locking bar, depicted in FIG. 6, to the drawer open position.

In operation the motor 42 is actuated in response to an electronic signal from a signal generator 50 or transmitter, for example, by means of infra-red transmission. The transmitter 50 thus transmits a signal picked up by a sensor connected to housing 44. A signal light 52, mounted in the front of cabinet housing 10, indicates activation of the sensor. That sensor signal is then transmitted, via a control line 54 in FIG. 4, to control system and logic circuitry 56 thereby effecting operation of a power source. The circuitry 56 thus initiates and controls operation of the motor 42. The motor 42 is operable to rotate a shaft 40 to thereby move the cam 38 against the cam surface 36. This causes the lever arm 28 to pivot as depicted in FIG. 7 in a clockwise direction indicated by the arrow. This causes the locking bar 26 to disengage from the latch plate 32 thereby permitting the drawer 20 to be opened. A typical garage door opener signal generator or transmitter and receiver may be used to effect the initiation of operation of the motor 42 via circuitry 56, for example.

Figure 6:
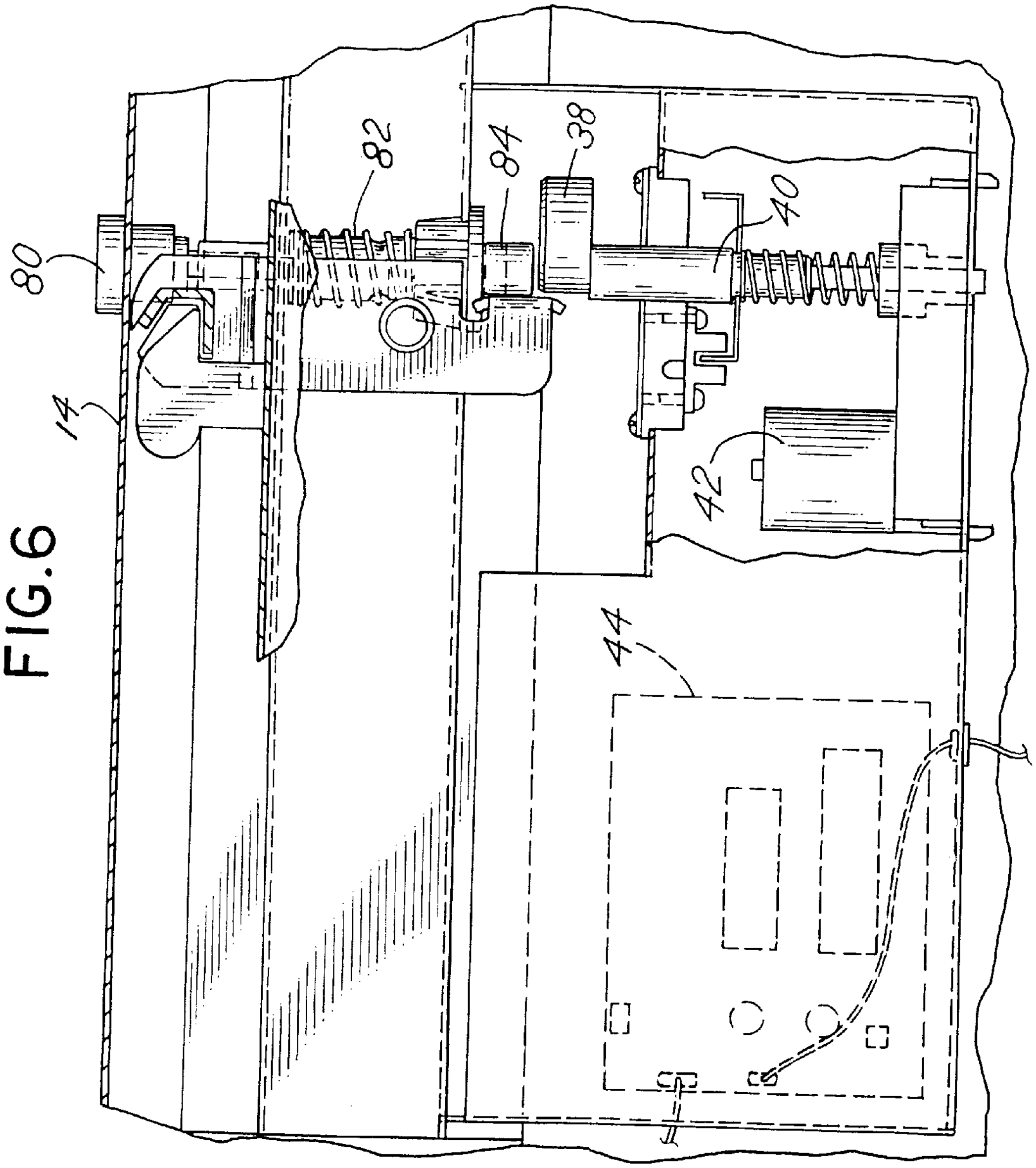
FIG. 6 is a plan view of the mechanism of FIG. 5.

The motor 42 also requires some feedback control signals to indicate the position of the shaft 40 and cam 38. Feedback signals are provided by sensors such as a hall sensor 68 which is responsive to the position of the shaft 40. For example, referring to FIGS. 9, 11, 12 and 13, a sensor members 68 may be mounted on the shaft 40. A sensor initiation device 60 includes a series of radially projecting arms 62, 64 and 66. The device 60 operates in combination with sensor 68 mounted in a fixed position relative to shaft 40. The arm 62 in combination with sensor 68 indicates a prelocked condition of the system. That is, when the arm 62 is aligned with a Hall effect sensor 68, the logic of the control system 56 indicates that the shaft 40 has been rotated to a position which is 40°, in a rotational sense, from providing fully locked engagement of the bar 26 with the latch plate 32. The signal to the motor 42 then persists for a further rotation 40° so that the arm 64 will be aligned with the sensor 68 thereby indicating that the shaft 40 is in a position or state wherein the bar 26 is in the locked or engaged position with plate 32. In this position, as depicted in FIG. 10, the cam 38, which is eccentrically mounted on the shaft 40, effectively is positioned as shown in FIG. 6 to release from surface 36 so that a biasing spring 70, associated with an upper lever arm 30 for the lock bars 24, 26 will cause the arms 28, 30 (and therefore the lock bars 24, 26) to rotate to the locked position.

In order to disengage the lock bar 26 from latch plate 32, a signal is again provided through the control circuitry and power source 56. This causes the motor 42 to rotate shaft 40 so as to align the arm 66 with the sensor 68 as depicted in FIG. 11. This 180° rotation causes the cam 38 to rotate against the cam surface 36 pivoting the lever arm 28 to the position shown in FIG. 7 causing bar 26 to release latch plate 32 of drawer 20.

A key operated manual override is provided to permit operation of the unlocking mechanism. Specifically, a key operated cylinder 80 may be rotated to thereby rotate a shaft 82 mounted in the housing 10. Rotation of the shaft 82 causes a cam member 84 on shaft 82 to engage against the cam surface 36 of the lever arm 28. This will cause the lever arm 28 to pivot the locking bar 26 out of engagement with the latch plate 32. In this manner, a manual override is provided for the entire system. Various other types of manual overrides may be provided besides the one which is described to effect pivoting of the lever arm 28.

The invention provides various enhanced security features. Remote access control is thus possible. The signal receiver or sensor 52 mounted in housing 10 associated with the remote control may include an LED light. Thus the receiving signal sensor 52 may include an LED light to indicate that the cabinet is either open or closed, as the case may be, or that a signal has been received. An audible alarm may be also provided within the system to indicate that the system has just engaged or disengaged. Utilizing traditional garage door opener type logic and circuitry, the user can program the signal source and sensor to operate on various different frequency settings. A mechanical override is provided in the event of an emergency situation. Thus there are various alternatives in variance of the subject matter of the invention. This invention is therefore to be limited only by the following claims and equivalents thereof.

What is claimed is:

1. In a storage cabinet of the type including a cabinet housing with a back side, and a plurality of cabinet drawers mounted for sliding movement into and out of the cabinet housing, said drawers having a back side in opposed proximity to the back side of the housing when the drawers are closed, the improvement of a remote control locking system for locking and releasing the drawers from a closed position in the cabinet housing, said locking system comprising, in combination:

a latch plate projecting rearwardly from the back side of at least one drawer, said latch plate including a retention hook for engaging a vertical locking bar;

a vertical locking bar adjacent the back side of the housing pivotally mounted to move about a pivot mount arcuately along a path for engagement with the latch plate, said locking bar mounted on and attached to a lever arm pivotal about the pivotal mount of the locking bar, said lever arm defining said pivot mount away from said vertical locking bar and including a cam surface, the cam surface and locking bar being on opposite sides of the pivot mount; a cam member mounted on the housing and rotatable about an axis to engage the cam surface, said cam shaped to engage the cam surface and effect pivoting of the lever arm and locking bar from engagement with the latch plate upon rotation of the cam to a first position, and to release the lever arm to effect engagement of the locking bar with the latch plate;

means for rotating the cam including a drive motor with an output shaft connect to the cam;

remote signal control means for controlling of the operation of the motor.

2. The improvement of claim 1 further including a sensor on the motor shaft for sensing the rotational position of the shaft and the cam.

3. The improvement of claim 1 further including a manually operable auxiliary cam mounted in the housing for engaging or operating the lever arms.

4. The improvement of claim 3 wherein the auxiliary cam is mounted in the back of the housing.

5. The improvement of claim 3 wherein the auxiliary cam is key operated.

6. The improvement of claim 1 wherein the locking bar is mounted on lever arms affixed to the opposite ends of the bar, said arms pivotally attached to the cabinet housing.

7. The improvement of claim 2 wherein the sensor comprises an auxiliary sensor to sense a first position of the shaft indicating partial rotational movement of the shaft to position the latching bar in a partially open or closed position and a main sensor to indicate rotational movement of the shaft to position the latching bar in a fully open or closed position.

8. The improvement of claim 1 further including a biasing member for biasing the lever arm to maintain the locking bar in the locked position engaging the latch plate.

* * * * *